3,565,896
PYRIDINECARBONYL DERIVATIVES OF 7-[ω-(N-ALKYL-N-OPTIONALLY HYDROXYALKYL SUBSTITUTED AMINO) - HYDROXYALKYL]THEOPHYLLINE
Giuseppe Ghielmetti and Tiberio Bruzzese, Milan, Italy, assignors to SPA—Societa Prodotti Antibiotici, S.p.A., Milan, Italy, a corporation of Italy
No Drawing. Filed Dec. 8, 1969, Ser. No. 883,265
Claims priority, application Great Britain, Dec. 10, 1968, 58,563/68
Int. Cl. C07d 57/48
U.S. Cl. 260—256          5 Claims

ABSTRACT OF THE DISCLOSURE

The present pyridinecarbonyl derivatives of 7-[ω-(N-alkyl-N-optionally hydroxyalkyl substituted amino)-hydroxyalkyl]theophylline possess diuretic, bronchiolar dilating, myocardial stimulating, smooth muscle relaxing, lipotropic and vasodilating activity and are useful as cardiotonic agents. The compounds are prepared by reaction of the corresponding 7 - [ω - (N-alkylamino)-hydroxyalkyl]theophylline or 7-[ω-(N-alkyl-N-hydroxyalkylamino)-hydroxyalkyl]theophylline with a pyridinecarboxylic acid or a reactive derivative thereof such as the pyridinecarbonyl halides. Alternatively the compounds can be prepared by reaction of theophylline with the appropriate pyridinecarbonyl derivative of an ω-(N-alkyl-N-optionally hydroxyalkyl substituted amino)-hydroxyalkyl halide or by reaction of an appropriate 7-[ω-halo-hydroxyalkyl]theophylline derivative with the appropriate secondary amine.

The present invention relates to pyridinecarbonyl derivatives of 7-[ω-(N-alkyl-N-optionally hydroxyalkyl substituted amino)-hydroxyalkyl]theophylline. Alternatively the present compounds can be considered as pyridinecarbonyl esters and amides of 7-[ω-(N-alkylamino)-hydroxyalkyl]theophylline.

Specifically, the present invention relates to compounds having the following general formula:

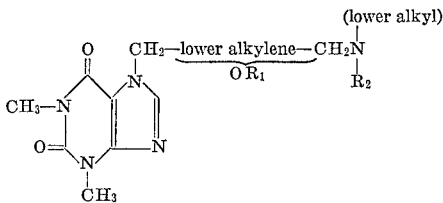

wherein $R_1$ is a hydrogen atom or a pyridinecarbonyl radical and $R_2$ is a pyridinecarbonyl or pyridinecarbonyloxy (lower alkyl) radical and, in addition when $R_1$ is pyridinecarbonyl, $R_2$ can also be a hydrogen atom or a hydroxy-lower alkyl radical. The pyridinecarbonyl radicals and radical groupings referred to above include pyridine-3-carbonyl (nicotinyl), 4-pyridinecarbonyl (isonicotinyl) and 2-pyridinecarbonyl (picolinyl). The lower alkylene radicals referred to above contain up to 5 carbon atoms and can be exemplified by methylene, ethylene, propylene, butylene, pentylene and the branched-chain isomers thereof. The $OR_1$-grouping is substituted on one of the carbon atoms of the lower alkylene radical. The lower alkyl radicals and radical groupings referred to above contain up to 6 carbon atoms, and can be exemplified by methyl, ethyl, propyl, butyl, pentyl and hexyl and the branched-chain isomers thereof.

Equivalent to the foregoing free bases of the general formula above are the non-toxic acid addition and quaternary ammonium salts thereof. The term "nontoxic" refers to those salts which are substantially nontoxic to the animal in therapeutic doses thereof. Suitable salts are those derived from inorganic acids, such as hydrochloric, hydrobromic, hydroiodic, sulfuric, phosphoric, nitric and sulfamic; from organic acids such as acetic, citric, lactic, maleic, malic, succinic, tartaric, cinnamic, benzoic, gluconic, ascorbic, salicylic, ethane disulfonic, fumaric, glycolic, and related acids.

Suitable quaternary ammonium salts are those derived from a variety of organic esters of sulfuric, hydrohalic and aromatic sulfonic acids. Among such esters are methyl chloride, bromide, and iodide, ethyl chloride, propyl chloride, butyl chloride, isobutyl chloride, benzyl chloride and bromide, phenethyl bromide, naphthylmethyl chloride, dimethyl sulfate, methyl benzene sulfonate, ethyl toluene sulfonate, ethylene chlorohydrin, propylene chlorohydrin, allyl bromide, methallyl bromide and crotyl bromide.

The compounds of this invention are useful because of their diuretic, bronchiolar dilating, myocardial stimulating, smooth muscle relaxing, lipotropic and vasodilating activity. The amides additionally demonstrate analeptic properties. The compounds of this invention exhibit a prolonged action and reduced side effects in contrast to the salt, 7 - [3 - (N-methyl-N-hydroxyethylamino)-2-hydroxypropyl]theophylline nicotinate. The present compounds can thus be used as cardiotonic agents in manners analogous to those for use with theophylline itself. The usual daily dosage is roughly about 2–10 mg. per kilogram of the host.

Thus for administration to a mammal weighing between 50 and 100 kilograms, the usual daily dose would be from about 100 milligrams to 1000 milligrams depending upon the weight of the mammal and the severity of the condition to be treated.

The compounds can be administered by the usual routes, for example orally, intramuscularly, intravenously or by suppository.

As regards the biological activity of our new theophylline derivatives, it was noticed that they are active above all as hypotensive agents; this action was studied on dogs and cats anesthetized with Pentobarbital Sodium salt and Chloralose; higher doses than 5 mg./kg. by intramuscular route cause a marked decrease in arterial pressure.

However the presence of the nicotinic radical in our compounds, in the form of ester or amide, does not induce so marked side-effects (blushing, etc.) as occurs with other compounds in which the nicotinic acid merely salifies a basic derivative of theophylline. Moreover the derivatives being the object of our invention display a long-lasting action with the practical advantage that the administration of equivalent doses can be spaced out in the time. Furthermore, these derivatives display a diuretic action which was evaluated in Wistar male rats weighing about 250 g. following W. L. Lipschitz et al. technique (J. Pharmacol. Exptl. Therap., 79, 97, 1943) modified by J. M. Little as described in "Method in Medical Research" (Yearbook pub., Chicago, 1952, vol. 5, 206). The doses used ranged between 50 and 500 mg./kg.

These compounds also display a lipotropic action which was detected during prolonged treatment in Wistar male rats.

Doses of 200–400 mg./kg./day per os have induced a marked decrease of serum cholesterol after 90–180 days of treatment.

Also the bronchodilating action which was determined "in vitro" on tracheal rings of guinea-pigs according to the method described by J. C. Castillo and E. J. De Beer (J. Pharmac. Exptl. Therap, 90, 104, 1947).

The concentrations of our products used were equal or higher than 5.10⁻⁵. Finally the activity on smooth muscles of guinea-pig's small intestine prepared according to Magnus' technique (Archives Physiol., 203, 514, 1904) was studied. The isolated organ was stimulated with standard doses of acetylcholine, histamine and $BaCl_2$. The activity of the substances being tested was determined starting from concentrations equivalent to $1.10^{-5}$.

The new compounds of this invention stimulate the synthesis of DPN and of the serum clearing factor and bring about a normalization of the fibrinogen rate and an activation of natural fibrinolysis. A decrease in the cholesterol rate is also observed. At the cardiovascular level, the administration of the new derivatives induces an increase in the systolic volume and in cardiac function, while in the central nervous system the blood flow is improved and the brain respiratory quotient normalized.

In the peripheral circulation, the vascular resistance is reduced, while an increase is observed in haemodynamics so that these new derivatives can also be called "haemokinetic substances."

The esters of the present invention are conveniently prepared by reaction of an appropriate alcohol of the formula

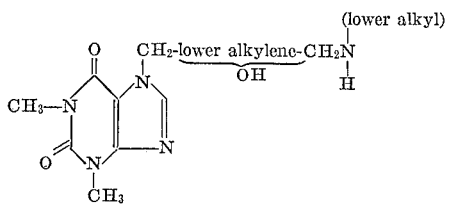

or

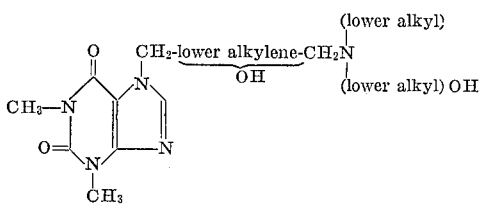

wherein lower alkylene and lower alkyl are defined as before with an appropriate pyridinecarboxylic acid or a reactive derivative thereof, such as a pyridinecarbonyl halide, preferably the chloride. The reaction is carried out in an inert solvent such as pyridine which can additionally serve as an acid acceptor for the hydrogen halide formed during the reaction when one of the reactants is a pyridinecarbonyl chloride. The mono-pyridinecarbonyl derivatives are obtained by reacting a starting material of the above formula with a slight excess of a pyridinecarbonyl halide, preferably the chloride. The di-pyridinecarbonyl derivatives can either be obtained in a single step by using two molecular equivalents or an excess of the pyridinecarbonyl halide or by further reacting the monosubstituted derivatives with the pyridinecarbonyl halide. Alternately, the mono-pyridinecarbonyl derivatives can be prepared by selective hydrolysis of the di-pyridinecarbonyl derivatives.

An alternate method for the preparation of the compounds of this invention is the reaction of theophylline with a compound of the formula

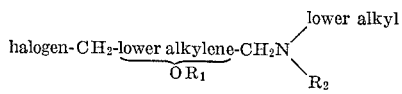

wherein the halogen is a bromide, iodide or preferably chloride atom, and lower alkylene, lower alkyl, $R_1$ and $R_2$ are defined as before in the presence of inert solvent such as pyridine. These pyridinecarbonyl derivative starting materials can be prepared from the corresponding alcohols by reaction with a pyridinecarbonyl halide.

Still another alternate method for the preparation of the compounds of this invention is the reaction of a 7-(ω-halohydroxyalkyl)theophylline derivative of the formula

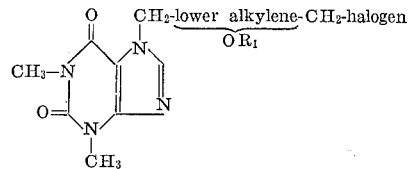

wherein the halogen, lower alkylene and $R_1$ are defined as before, with the appropriate amine of the formula

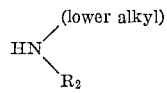

wherein lower alkyl and $R_2$ are defined as before in the presence of an inert solvent.

The compounds of this invention are isolated from the reaction mixture used for their preparation by distilling off the solvent under reduced pressure and extracting the residue with an organic solvent such as benzene or chloroform, after treatment with a concentrated solution of sodium carbonate. The solution thus obtained is then dried so as to give the desired compound. The products can subsequently be purified, if necessary, by silica gel chromatography, the column first being eluated with benzene to remove any impurities and then with appropriate mixtures of benzene and ethanol.

The products can be isolated from the eluates by concentration under vacuum and submitted to the usual analysis and to thin layer chromatography on silica gel.

10% saturated ammonia butanol can be used as eluent, while Dragendorff's reagent is employed as a detector, by subsequently spraying the spots with a solution containing 1% of silver nitrate and 5% of sulfuric acid in order to increase the sensitivity of the color reaction.

The new compounds, when in the form of the free bases, are usually viscous oily substances, which are soluble in water and cannot be distilled even under high vacuum. They give stable salts with many organic and inorganic acids and are very soluble in water to give solution with a slightly acid pH; many of the salts can easily be crystallized and this property can be utilized during the preparation thereof in order to isolate the very pure compounds. During the preparation of the hydrochlorides, it is advisable to use equimolecular quantities of hydrochloric acid in order to prevent the possible formation of dihydrochlorides, which are generally very hygroscopic.

The new derivatives according to the present invention can also be converted into the corresponding quaternary ammonium compounds by reaction with quaternizing agents in the manner known from the literature.

The following examples further illustrate the invention and should not be construed as limiting the scope thereof. In these examples the following abbreviations are used: g. (grams), ml. (milliliters) and ° C. (degrees centigrade).

EXAMPLE 1

7 - [3 - (N - methyl - N - nicotinyloxyethylamino) - 2-hydroxypropyl]-theophylline.—62.2 g. (0.2 mole) 7-(3-(N - methyl - N - hydroxyethylamino) - 2 - hydroxypropyl)theophylline are dissolved in 300 ml. anhydrous pyridine and 39.2 g. (0.22 mole) nicotinyl chloride hydrochloride are added at ambient temperature, while stirring. Since the reaction is exothermic, occasional external cooling of the reaction mixture is necessary.

The reaction mixture is then stirred at ambient temperature for 24 hours and a further 7.1 g. (0.04 mole) nicotinyl chloride hydrochloride are then added to complete the reaction, stirring being continued for a further 24 hours. At the end of the reaction, the mixture containing the desired 7-[3-(N-methyl-N-nicotinyloxyethylamino)-2- hydroxy propyl]theophylline hydrochloride in partial suspension is evaporated to dryness by distilling off the pyridine under reduced pressure to give a doughy residue.

A 20% aqueous solution of sodium carbonate is added until the aqueous phase becomes alkaline and the separated oil is extracted with three 300 ml. portions of benzene. The benzene solution is washed with 50 ml. of a saturated aqueous solution of sodium chloride and then dried over anhydrous sodium sulphate, whereafter the solvent is distilled off under reduced pressure. The product thus obtained is a viscous oil. This product can be purified by silica gel chromatography (1:10), the column being first eluated with benzene to remove any impurities and then with a mixture of benzene and ethanol (8:2) in order to obtain the pure product.

However, the crude product is preferably converted directly into a suitable salt which can easily be crystallized. With this purpose, the oily product is dissolved in 350 ml. ethanol and decolorized with charcoal; a solution of 5% dry hydrogen chloride in ethanol is then added until the pH is 4.2 and the resulting solution is left to stand overnight. The separated product is filtered off, washed with ethanol and dried at 40° C. under vacuum. 7-[3-(N-methyl - N - nicotinyloxyethylamino) - 2 - hydroxypropyl]theophylline hydrochloride is obtained as a colorless, crystalline substance; M.P. 197–199° C. (decomposition). After recrystallization from 90% ethanol, the pure compound melts at 199–200° C. (dec.).

This compound can alternatively be prepared by the reaction of a 7-(3-halo-2-hydroxypropyl)theophylline with a molecular excess of the secondary amine, methyl-nicotinyloxyethylamine in an inert solvent such as anhydrous pyridine. The latter amine is prepared by reaction of a nicotinyloxyethyl halide with methylamine.

Other methods of preparation can be followed such as the reaction of 3-(N-methyl-N-nicotinyloxyethylamino)-2-nicotinyloxy-1-chloropropane (M.P. 80–81°; obtained from 3 - (N-methyl-N-hydroxyethylamino)-2-hydroxy-1-chloropropane and nicotinyl chloride hydrochloride in excess in pyridine solution) and sodium theophyllinate in boiling alcohols, the nicotinic radical in position 2 beng split off by alcoholysis.

EXAMPLE 2

Substitution of a molecular equivalent quantity of the appropriate 7 - [ω - (N - alkyl-N-hydroxyalkylamino)-hydroxyalkyl]theophylline for the 7-[3-(N-methyl-N-hydroxyethylamino)-2-hydroxypropyl]theophylline in the procedure of the preceding example affords:

7-[3-(N-propyl-N-nicotinyloxyethylamino)-
2-hydroxypropyl]theophylline
7-[3-(N-hexyl-N-nicotinyloxyethylamino)-2-
hydroxypropyl]theophylline
7-[3-(N-methyl-N-nicotinyloxymethylamino)-2-
hydroxypropyl]theophylline
7-[3-(N-methyl-N-(2-propyl-3-nicotinyloxypropyl)
amino)-2-hydroxypropyl]theophylline
7-[5-(N-methyl-N-nicotinyloxyethylamino)-4-
hydroxypentyl]theophylline
7-[3-(N-propyl-N-nicotinyloxyethylamino)-2-
hydroxy-2-propylpropyl]theophylline

EXAMPLE 3

Substitution of a molecular equivalent quantity of 2-pyridinecarbonyl chloride and 4-pyridinecarbonyl chloride, respectively, in the procedure of Example 1 affords, respectively:

7-[3-(N-methyl-N-(2-pyridinecarbonyloxy)-ethylamino)-
2-hydroxypropyl]theophylline
7-[3-(N-methyl-N-(4-pyridinecarbonyloxy)-ethylamino)-
2-hydroxypropyl]theophylline

EXAMPLE 4

7 - [3 - (N - methyl - N - nicotinyloxyethylamino) - 2-nicotinyloxypropyl]theophylline.—62.2 g. (0.2 mole) 7-[3 - (N - methyl - N - hydroxyethylamino) - 2 - hydroxypropyl]theophylline are dissolved in 350 ml. anhydrous pyridine and 92.5 g. (0.52 mole) nicotinyl chloride hydrochloride added while stirring. The temperature increases to 40–45° C. since the reaction is exothermic. The reaction mixture is then stirred at ambient temperature for 48 hours and the pyridine thereafter removed by distillation under reduced pressure.

The solid residue is treated with a 20% aqueous solution of sodium carbonate until the aqueous phase becomes alkaline and the separated oil is extracted with three 300 ml. portions of benzene.

The combined benzene extracts are washed with two 100 ml. portions of a saturated aqueous solution of sodium chloride and dried over anhydrous sodium sulphate. The solvent is then removed under reduced pressure, 7-[3-(N - methyl - N - nicotinyloxyethylamino) - 2 - nicotinyloxypropyl]theophylline being obtained in the form of a viscous oil.

This product is then converted into the corresponding hydrochloride by dissolving in 150 ml. ethanol and then adding 5% dry hydrogen chloride in ethanol until the pH is 4. After charcoal decoloration, 500 ml. of ethyl acetate are added until the solution is turbid and the solution then left to stand for 2 days.

The copious precipitate thus obtained is filtered off, washed with ethyl acetate and dried at 40° C. under a vacuum.

The precipitate is 7-[3-[N-methyl-N-nicotinyloxyethylamino)-2 - nicotinyloxyropyl]theophylline hydrochloride which, after recrystallization from methanol/ethyl acetate, melts at 128–129° C. (dec.) and is a colorless crystalline substance.

The product described in this example can also be obtained by further esterification of the product described in Example 1 with excess nicotinyl chloride, using the above-described procedure.

EXAMPLE 5

Substitution of the appropriate 7[ω-(N-alkyl-N-hydroxyalkylamino)hydroxyalkyl]theophylline for the 7-[3-(N-methyl - N - hydroxyethylamino)-2-hydroxypropyl] theophylline used in Example 4 affords the following:

7-[3-(N-ethyl-N-nicotinyloxyethylamino)-2-nicotinyl-
oxypropyl]theophylline
7-[3-(N-methyl-N-nicotinyloxypropylamino)-2-nicotinyl-
oxypropyl]theophylline
7-[4-(N-methyl-N-nicotinyloxyethylamino)-3-nicotinyl-
oxybutyl]theophylline

EXAMPLE 6

7 - {3[N-methyl-N-(4-pyridinecarbonyloxy-ethylamino] 2-(4-pyridinecarbonloxy)propyl}theophylline. — 31.1 g. (0.1 mole) 7 - [3-(N-methyl-N-hydroxyethylamino) - 2 - hydroxypropyl]theophylline are dissolved in 175 ml. anhydrous pyridine and 46.2 g. (0.26 mole) 4-pyridinecarbonyl chloride hydrochloride are added while stirring giving an exothermic reaction. The mixture is stirred at ambient temperature for 48 hours and the pyridine distilled off under reduced pressure. The residue is treated following the procedure of the Example 4 to give the required compound as a crystalline substance, M.P. 135–136° C. This product is treated with dry hydrogen chloride in methanol until the pH is 4 and the 7-{3-[N-methyl-N-(4-pyridinecarbonyloxy)ethylamino]-2 - (4 - pyridinecarbonloxy)propyl}theophylline hydrochloride is obtained as a colorless substance which melts at 191–192° C. (dec.)

EXAMPLE 7

7 - [3 - (N-methyl-N-nictinyloxyethylamino) - 2 - nicotinyloxypropyl]theophylline trimethiodide.—52.1 g. (0.1 mole) 7 - [3 - (N-methyl-N-nicotinyloxyethylamino)-2-nicotinyloxypropyl]theophylline (obtained as in Example 4) and 78.1 g. (0.55 mole) methyl iodide are dissolved in 400 ml. ethanol and the solution refluxed slowly for 4 hours, a doughy precipitate gradually being formed which subsequently solidifies when the reaction mixture is cooled.

The product is filtered off, washed with ethanol and then suspended in 500 ml. boiling methanol. The suspension is then filtered while hot and 7-[3-(N-methyl-N-nicotinyloxyethylamino) - 2 - nicotinyloxypropyl]theophylline trimethiodide is obtained in the form of a slightly yellow, crystalline substance; M.P. 200–201° C. (dec.). Before analysis, the product is dried at 40° C. under vacunm.

EXAMPLE 8

7 - [3 - (N-methyl-N-nicotinamido)-2-hydroxypropyl]-theophylline.—53.5 g. (0.2 mole) 7-[3-methylamino)-2-hydroxypropyl]theophylline are dissolved in 300 ml. anhydrous pyridine; 42.7 g. (0.24 mole) nicotinyl chloride hydrochloride are then added portionwise, the temperature increasing to 40–45° C. because the reaction is exothermic. The reaction mixture is stirred for 24 hours at ambient temperature, then evaporated to dryness by distilling off the pyridine under reduced pressure. The doughy residue is dissolved in a little water and the solution is treated with excess sodium carbonate. The oily product which thus separates is extracted with three 300 ml. portions of chloroform and dried over anhydrous sodium carbonate. The solvent is then distilled off under reduced pressure. The residue, which is 7-[3-(N-methyl-N-nicotinamido)-2-hydroxypropyl]theophylline, is dissolved in 400 ml. absolute ethanol; the solution is decolorized with charcoal and a current of dry hydrogen chloride passed in until the pH is 3. The copious precipitate thus obtained is filtered off, washed with ethanol and dried at 40° C. 7 - [3 - (N-methyl-N-nicotinamido) - 2 - hydroyypropyl]theophylline hydrochloride is obtained; M.P. 179–180° C. (dec.). After recrystallization from ethanol, the product melts at 182–183° C. (dec.) and is a colorless, crystalline substance.

EXAMPLE 9

Substitution of a molecular equivalent quantity of 2-pyridinecarbonyl chloride and 4-pyridinecarbonyl chloride for the nicotinyl chloride used in Example 7 affords, respectively:

7-[3-(N-methyl-N-(2-pyridinecarbonyl)-amido)-2-hydroxypropyl]theophylline, and
7-[3-(N-methyl-N-(4-pyridinecarbonyl)-amido)-2-hydroxypropyl]theophylline

EXAMPLE 10

180 g. of theophylline are dissolved in 1800 ml. of anhydrous pyridine and 600 g. of 3-(N-methyl-N-hydroxyethylamino)-2-nicotinyloxy-1-iodopropane are added at room temperature with stirring. Stirring is continued at room temperature for about 24 hours. At the end of this time, the mixture containing the desired 7-[3-(N-methyl-N-hydroxyethylamino) - 2 - nicotinyloxypropyl]theophylline hydrochloride in partial suspension is evaporated to dryness by distilling off the pyridine under reduced pressure to give a sticky residue.

A 20% aqueous solution of sodium carbonate is added until the aqueous phases become alkaline and the separated product is extracted with three 1500 ml. portions of benzene. The benzene is washed with 250 ml. of saturated aqueous solution of sodium chloride and then dried over anhydrous sodium sulfate, then the solvent is distilled off under reduced pressure. The product can be purified by silica gel chromatography.

EXAMPLE 11

Substitution of a molecular equivalent quantity of the appropriate 7 - [3-(N-alkyl-N-pyridinecarbonylamido)-2-hydroxypropyl]theophylline for the 7 - [3 - (N-methyl-N-hydroxy-ethylamino)-2-hydroxypropyl]theophylline in the procedure of Example 1 affords the following:
7-[3-(N-methyl-N-nicotinamido)-2-nicotinyloxypropyl]theophylline 7-[3-(N-methyl-N-nicotinamido-2-nictonyloxy-2-methylpropyl]theophylline
7-[3-(N-propyl-N-nicotinamido)-2-nicotinyloxypropyl]theophylline The new compounds according to the present invention can be administered orally in the form of tablets, syrup, pills, film-coated tablets, drops, granulates and spersoids and, generally, in any form used for oral administration in association with suitable vehicles, sweetening agents, natural or artificial flavours and the like. The new compounds according to the present invention can also be administered rectally in admixture with suitable vehicles. They can also be administered parenterally either in the form of injections or in drip infusion.

The injections or drip infusion solutions can be prepared immediately prior to use by dissolving the lyophilised compounds in appropriate sterile liquid carriers.

What is claimed is:

1. A compound of the formula

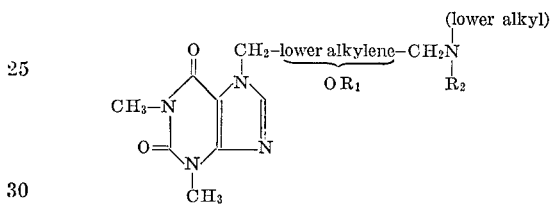

wherein $R_1$ is selected from the group consisting of the hydrogen atom and pyridinecarbonyl radicals, and $R_2$ is selected from the group consisting of pyridinecarbonyl and pyridinecarbonyloxy (lower alkyl) radicals, and, in addition when $R_1$ is pyridinecarbonyl, $R_2$ can also be a hydrogen atom, or a hydroxy-lower alkyl radical.

2. A compound as in claim 1, which is selected from the group consisting of compounds of the general formula

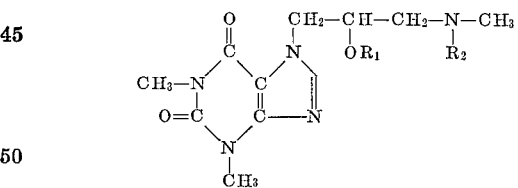

wherein $R_1$ is selected from the group consisting of the hydrogen atom and nicotinyl radicals, and $R_2$ is selected from the group consisting of nicotinyl and nicotinyloxy (lower alkyl) radicals.

3. As in claim 1, 7-[3-(N-methyl-N-nicotinyloxyethylamino)-2-hydroxypropyl]theophylline.

4. 7 - [3 - (N-methyl-N-nicotinyloxyethylamino) - 2 - nicotinyloxypropyl]theophylline.

5. 7 - [3 - (N-methyl-N-nicotinamido) - 2 - hydroxypropyl]theophylline.

References Cited

UNITED STATES PATENTS 2,878,251  3/1959  Zirm et al. _____ 260—256

ALEX MAZEL, Primary Examiner

A. M. T. TIGHE, Assistant Examiner

U.S. Cl. X.R.

424—200, 232, 253

PO-1050
(5/69)

UNITED STATES PATENT OFFICE
CERTIFICATE OF CORRECTION

Patent No. 3,565,896      Dated February 23, 197.

Inventor(s) Giuseppe Ghielmetti and Tiberio Bruzzese

It is certified that error appears in the above-identified patent and that said Letters Patent are hereby corrected as shown below:

Column 2, line 57, "W. L. Lipschitz" should be --Lipschitz's W. L. --.

Column 2, line 59, "J. M. Little" should be -- Little J.

Column 2, line 71, "J. C. Costello and E. J. De Beer" she be -- Castello J. C. and De Beer E. J. --.

Column 6, line 30 "-nicotinyloxyropyl]theophylline" shou: be ---nicotinyloxypropyl]theophylline --.

Column 6, line 51, "{3[" should be -- {3-[ --.

Column 6, line 51, "pyridinecarbonyloxy-" should be -- pyridinecarbonyloxy)- --.

Column 6, line 52, "-pyridinecarbonloxy)" should be -- -pyridinecarbonyloxy) --.

Column 6, line 66, "bonoxy)" should be -- bonyloxy) --.

Column 7, line 32, "hydroyypropyl]" should be -- hydroxypropyl] --.

Column 7, line 72, "hydroxy-ethylamino)-" should be -- hydroxyethylamino)- --.

Column 8, line 1, "-nictonyloxy-" should be -- nicotinylc

Signed and sealed this 17th day of August 1971.

(SEAL)
Attest:

EDWARD M.FLETCHER,JR.      WILLIAM E. SCHUYLER, J
Attesting Officer      Commissioner of Patent